Patented Sept. 12, 1933

1,926,412

UNITED STATES PATENT OFFICE 1,926,412

WELDING COMPOSITION

Frank L. Thompson, Lansing, Mich.

No Drawing. Application July 12, 1932
Serial No. 622,170

1 Claim. (Cl. 75—1)

This invention relates to welding compositions for use in permanently joining portions of articles or sheets of so-called white metal. It has been the experience of this applicant that much difficulty arises in an endeavor to strongly integrate white metal edge portions in making repairs or for other and general purposes in manufacturing. By white metal the applicant means alloys or mixtures of which there are a number more or less related to the following:—

(a) 82% tin; 12% antimony; 6% copper.
(b) 75% lead; 19% antimony; 5% tin; 1% copper.
(c) 70% lead; 18% antimony; 10% tin; 2% copper.

The formula determined by this applicant after extended trials and experiments to be superior for the purpose desired, comprises 90% zinc compounded with 5% copper and 5% antimony. The reasons for selecting and proportioning the said ingredients to produce this invention are that antimony is employed to eliminate shrinkage; copper to give toughness to the connection, and zinc as a base or flux and to readily mix with white metal of the general nature above set out.

In the invention of applicant the zinc as a base is harder than tin, but under the action of this composition tin and lead develop a somewhat similar nature, and where zinc, tin or lead are used for the base of the white metal, the zinc of this invention will readily mix with the same. Applicant uses the zinc as a base because it is in many respects similar to the base of the white metal. It mixes readily with tin, lead or zinc. It is also more heat resistant than a formula would be having tin or lead for its base.

In the preparation of this invention, the copper is melted to about 1083° C. The antimony is added to the molten copper and the mixture brought to a free melting point. The zinc is added and the mixture brought to a melted condition and stirred until thoroughly mixed. It is customarily cast in bars for subsequent use.

In operation the white metal is prepared by cleaning with a suitable instrument as a rasp or file, or by means of an emery wheel or the like. The parts to be repaired are then brought to the fusing point with a torch or blowpipe, and the composition made in accordance with this invention is then fused in. The resulting weld is of greater toughness and is stronger than that obtained by the use of any other composition with which he is acquainted in practice or otherwise. There are other formulas that are or may be used but so far as this applicant is aware they all fail from lack of toughness and heat resisting quality.

Having now described this invention and its uses, I claim:—

A special welding composition for application to so-called white metals, said white metals being alloys such as herein described, the said welding composition comprising a mixture of five parts copper and five parts antimony to which has been added ninety parts of zinc as specified.

FRANK L. THOMPSON.